United States Patent Office 2,913,328
Patented Nov. 17, 1959

2,913,328

ISOBUTYL-N,N-DIETHYLTHIOLCARBAMATE AND USE AS HERBICIDE

Harry Tilles, El Cerrito, and Joe Antognini, Mountain View, Calif., assignors to Stauffer Chemical Company, a corporation of Delaware No Drawing. Application January 16, 1956
Serial No. 559,127

3 Claims. (Cl. 71—2.7)

This invention relates to a certain novel composition of matter, the method of making the composition, and the use of the composition as an herbicide. More particularly, it has been found that isobutyl N,N-diethylthiocarbamate (hereinafter sometimes referred to as R-1853) has valuable herbicidal properties and is particularly useful as a pre-emergence herbicide.

The following illustrative example demonstrates the method which may be employed to make the compound of the present invention. In the example, all parts are by weight.

Example 1.—Sodium is dispersed in xylene using oleic acid as the stabilizing agent until a particle size of 5–200 microns in diameter is obtained. Dispersion, equivalent to an amount of 3.45 parts (0.15 mole) of sodium, is then transferred to a reactor which has been previously flushed out with argon (or other inert gas such as nitrogen). A solution of 16.9 parts (0.188 mole) of 2-methyl-1-propanethiol dissolved in 86 parts of xylene is then gradually added to the sodium dispersion over an interval of 30 minutes. The temperature is maintained at 25° to 36° C. by cooling. The sodium 2-methyl propylmercaptide forms as finely divided crystals which make an easily stirrable slurry. This suspension is heated to reflux, the heat is turned off, and 20.3 parts (0.15 mole) of diethylcarbamyl chloride is added over an interval of 17 minutes to the refluxing slurry. The heat of reaction is sufficient to keep the xylene refluxing. After all of the carbamyl chloride has been added, the mixture is refluxed for an additional three hours. It is then cooled, filtered from sodium chloride which has formed during the reaction, and the solvent is removed under reduced pressure. The residual liquid is then distilled under vacuum to give 20.0 parts (70.3% yield) of isobutyl N,N-diethylthiolcarbamate (B.P. (19 mm.) 122–125° C., $n_D^{28}$ 1.4748).

The compound of the present invention has been extensively tested as a herbicide and has been particularly evaluated as a pre-emergence herbicide. Pre-emergence herbicides are ordinarily used by placing a narrow band of the herbicide over the center of a seeded crop row at the time of planting or before the crop emerges. If the herbicide is harmless to the desired crop seeds or seedlings, but phytotoxic to the seeds or seedlings most frequently encountered, the crop grows in an almost weed-free environment. Of course, the pre-emergence herbicide may be used over the entire field, but it is normally used in a narrow band which straddles the crop row and the balance of the weeds are controlled by various cultivation methods. The herbicides of the present invention are selective toward small seeded annual grasses and broadleafed plants, and so are effective against the most common weeds but have little effect on such valuable row crops such as corn and beans. The phytocidal composition may be applied to the soil in any convenient form. For instance, it can be dissolved in a solvent, such as acetone, or emulsified and sprayed onto the soil or it can be combined with a dry inert carrier and applied as a dust or as granules. Although the composition may be applied to an entire crop plot, it is generally preferred to apply it in a narrow band, say 6 inches, over the seeded rows of a newly planted crop. Generally, rates of application of from one-half to twenty pounds per acre of actual area treated will be found suitable.

Example 2.—The compound was tested in flats in the greenhouse at 2½ and 10 lbs./80 gallons of solution/acre. Application made with a fan type nozzle at 25 lbs. pressure. The seeds tested were peas, corn, squash, snapbeans, rye and oats. The data set forth below were obtained:

Table I

| Compound | Rate/acre, lbs. | Peas | | Corn | | Squash | | Snapbeans | | Rye | | Oats | |
|---|---|---|---|---|---|---|---|---|---|---|---|---|---|
| | | Ge. | Gr. | Ge. | Gr. | Ge. | Gr. | Ge. | Gr. | Ge. | Gr. | Ge. | Gr. |
| R-1853 | 2½ | 100 | 8.5 | 100 | 10 | 100 | 10 | 100 | 10 | 0 | ----- | 100 | 2 |
| | 10 | 55 | 6 | 100 | 9.5 | 100 | 10 | 100 | 10 | 0 | ----- | 100 | 1 |

Ge.=Indicates percentage of seeds germinating.
Gr.=Growth wherein 10 equals normal growth and 0 indicates no growth.

We claim:
1. As a new composition of matter, isobutyl N,N-diethylthiolcarbamate.
2. The method of combatting weeds comprising applying to the soil a phytotoxic amount of isobutyl N,N-diethylthiolcarbamate.
3. The process of claim 2 wherein the compound is applied in a narrow band to a row crop at a rate of from one-half to twenty pounds per acre of area actually treated.

References Cited in the file of this patent

UNITED STATES PATENTS

| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,687,348 | Kosmin | Aug. 24, 1954 |

OTHER REFERENCES

Riemschneider et al.: Monatshefte 84, pages 518–21 (1953).